UNITED STATES PATENT OFFICE.

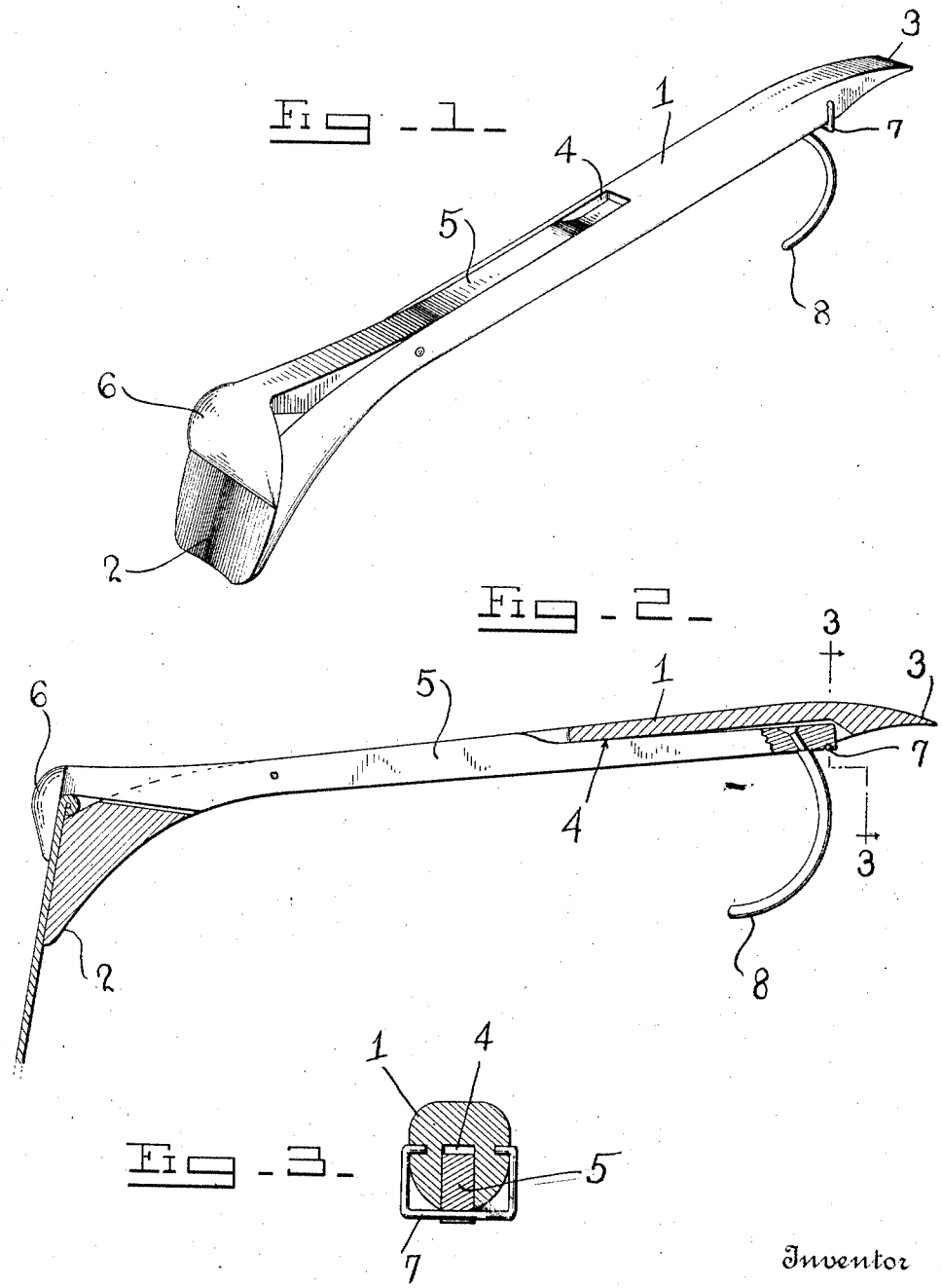

CHARLES NELSON, OF SKYKOMISH, WASHINGTON.

LIFTER.

1,360,140.　　　　　　Specification of Letters Patent.　　Patented Nov. 23, 1920.

Application filed February 13, 1918. Serial No. 216,931.

*To all whom it may concern:*

Be it known that I, CHARLES NELSON, a male citizen of the United States, residing at Skykomish, in the county of King and State of Washington, have invented new and useful Improvements in Lifters, of which the following is a specification.

This invention relates to lifters especially adapted to be used for handling pots, pans, kettles and stove lids or similar articles, and it consists in the novel features hereinafter described and claimed.

An object of the invention is to provide a lifter of the character stated which is of simple and durable structure and which may be easily and quickly manipulated to grasp the article and release the same.

With the above object in view the lifter includes a handle member provided at one end with a jaw and having a slot disposed longitudinally thereof. A lever is pivotally connected with the handle member and passes through the slot thereof. The lever is provided at one end with a jaw adapted to coöperate with the jaw of the handle member in grasping an object as for instance a pan or pot. The lever is provided with a hook which may serve as means for hanging the device upon a peg or support and which also serves as means for preventing the device from slipping from the hand of an operator when a heavy object is being lifted. A bail is pivotally connected with the handle member and is adapted to engage over the free end of the lever whereby the same may be retained in a closed position with relation to the handle member. The handle member is provided at one end with a lip which may be inserted in the socket of a stove lid for the purpose of lifting the lid.

In the accompanying drawing:

Figure 1 is a perspective view of the lifter.

Fig. 2 is a longitudinal section of the invention showing the same in use.

Fig. 3 is a cross section on line 3—3 of Fig. 2.

The lifter comprises a handle member 1 which is provided at one end with a jaw 2 having an inclined or working surface. The said member 1 is provided at its opposite end with a lip 3 which is adapted to be inserted in the socket of a stove lid for the purpose of lifting the same. A slot 4 is disposed longitudinally of the handle 1 and its ends terminate short of the ends of the said handle. A lever 5 is pivoted to the handle member 1 and may lie in the slot 4. The said lever passes through the said slot and the lever is provided at one end with a jaw 6 adapted to coöperate with the jaw 2 of the handle member 1 when the device is used for lifting pots, pans or the like. A bail 7 is pivoted upon the handle member 1 and is adapted to engage over the free end portion of the lever 5 whereby the said lever may be secured in a closed position in the slot 4 of the handle member 1. A hook 8 is mounted upon the handle member 1 and may be engaged over a nail or peg for supporting the device when not in use and the said hook may also serve as a guard or an abutment when the device is used for lifting heavy articles to prevent the lifter from slipping from the hand of the operator.

It is apparent that when the device is used for lifting a pot or pan, the lever is swung to an open position with relation to the handle member whereby the edge of the article to be lifted is positioned between the jaws 2 and 6. The said lever is then swung with relation to the handle member whereby the edge portion of the article is clamped and secured between the said jaws. The article may then be readily lifted or carried and when it is desired to remove the lifter from the article the operation above described is reversed.

From the foregoing description taken in conjunction with the accompanying drawing, it will be seen that a lifter of simple and durable structure is provided and that the same may be conveniently used for lifting heavy or hot articles or utensils of the character stated.

Having described the invention what is claimed is:—

A lifter comprising a handle member having a curved front end and provided with a longitudinally extending slot ending in a recess in the bottom of the member at the rear end thereof, a jaw formed by the front curved end of said member, the operative face of said jaw extending at right angles to said member, the front end wall of the slot being at right angles to the face of the jaw, a lever pivoted in the slot and having its rear end part offset and engaging the recess when the device is in closed position, the front part of said lever having an inclined under edge for engaging the front wall of the slot, a jaw extending at right angles from the front end of said lever, said jaw being of considerable less length than the other jaw but of the same width, a curved member on the rear end of said lever and a bail pivoted to the rear end of the member and engaging the rear end of the lever for holding the same within the slot and recess.

In testimony whereof I affix my signature.

CHARLES NELSON